United States Patent [19]

Yuhashi

[11] Patent Number: 5,133,438

[45] Date of Patent: Jul. 28, 1992

[54] VISCOUS COUPLING WITH SPACER RINGS

[76] Inventor: Yukio Yuhashi, c/o Viscodrive Japan K. K., Toranomon Center Building 8F 1-16-17 Toranomon, Minato-Ku, Tokyo 105, Japan

[21] Appl. No.: 620,463

[22] Filed: Nov. 29, 1990

[30] Foreign Application Priority Data

Dec. 1, 1989 [JP] Japan .................. 1-138675[U]

[51] Int. Cl.⁵ ............................................. F16D 35/00
[52] U.S. Cl. ....................................................... 192/58 B
[58] Field of Search ............... 192/58 B, 58 C, 70.28; 475/87, 231

[56] References Cited

U.S. PATENT DOCUMENTS

| | | | |
|---|---|---|---|
| 3,373,633 | 3/1968 | Desmond et al. | 192/58 B |
| 3,390,748 | 7/1968 | Hein et al. | 192/58 B |
| 4,058,027 | 11/1977 | Webb | 192/58 B |
| 4,444,298 | 4/1984 | Stangroom | 192/21.5 |
| 4,925,409 | 5/1990 | Johnson | 192/58 B X |
| 4,938,322 | 7/1990 | Sugasawara et al. | 192/58 B X |

FOREIGN PATENT DOCUMENTS

| | | | |
|---|---|---|---|
| 0230962 | 8/1987 | European Pat. Off. | 192/58 B |
| 0127521 | 6/1987 | Japan | 192/58 B |
| 0259223 | 10/1988 | Japan | 192/58 B |
| 1226309 | 3/1971 | United Kingdom | 192/58 B |

Primary Examiner—Rodney H. Bonck
Attorney, Agent, or Firm—Harness, Dickey & Pierce

[57] ABSTRACT

A viscous coupling has an operating chamber in which: first and second (resistance) plates for transmitting torque therebetween are so arranged to be rotatable relative to each other, while spaced alternately with each other; and a viscous fluid is filled in the operating chamber, so that the resistance of the viscous fluid to rotation of the plates contributes to transmitting of torque between the first and the second plates. The coupling further comprises a plurality of spacer rings each of which is interposed between adjacent ones of the first or the second plates, each of which spacer rings is provided with an annular groove in which a peripheral portion of each of the second or the first plates is fitted, so that the first plates are surely spaced apart from the second plates through the spacer rings, whereby the hump torque is prevented from being produced in the coupling even when a difference in rotational speed between the first plates and second plate increases.

7 Claims, 4 Drawing Sheets

VISCOUS COUPLING WITH SPACER RINGS

BACKGROUND OF THE INVENTION

1. Field of the Invention

The present invention relates to a viscous coupling for a vehicle and the like, and more particularly to a viscous coupling provided with an operating chamber filled with a viscous fluid, the viscous resistance of which to rotation of a plurality of resistance plates of torque-transmitting members makes it possible to transmit torque from one of the torque-transmitting members to the other thereof.

2. Description of the Prior Art

As is well known, a conventional viscous coupling is constructed of: a first torque-transmitting member; a second torque-transmitting member rotatably arranged relative to the first torque-transmitting member; an operating chamber which is hermetically defined by a housing member and a shaft member while filled with a viscous fluid such as high viscosity silicone oils; a plurality of first resistance plates so mounted on the first torque-transmitting member as to be non-rotatable relative to the first torque-transmitting member; and a plurality of second resistance plates so mounted on the second torque-transmitting member as to be non-rotatable relative to the second torque-transmitting member, the second resistance plates being spaced alternately with the first resistance plates in the operating chamber; whereby the viscous resistance of the viscous fluid to rotation of the first ones or second ones of the resistance plates to the other (i.e., the second ones or first ones) of the resistance plates provides a means for transmitting torque between the first resistance plates and the second resistance plates, which torque so automatically varies as to be substantially proportional to a difference in rotational speed between the first resistance plates and the second resistance plates of the torque-transmitting members, for example, one of which torque-transmitting members is connected with a front-wheel shaft while the other of which torque-transmitting members is connected with a rear-wheel shaft.

The conventional viscous coupling of this type is disclosed in, for example such as Japanese Patent Laid-Open No. 50349/1983 (in Japanese, called Tokkaisho 58-50349), and employed as: a part of a power-transmitting unit interposed between a front-wheel axle and a rear-wheel axle of a four-wheel drive vehicle; or a limited slip differential interposed between opposite wheels of a front-wheel axle of a front-wheel drive vehicle and the like.

In operation, for example, when rear wheels of the four-wheel drive vehicle provided with such conventional viscous coupling are stuck in the mud and the like to produce a difference in rotational speed between the front-wheel axle and the rear-wheel axle of the four-wheel drive vehicle, the viscous coupling of the four-wheel drive vehicle limits the difference in rotational speed between the front-wheel axle and the rear-wheel axle to enable the vehicle to escape from the mud and the like. More particularly, in case that the rear-wheel axle of the vehicle rotates at a high speed when the rear wheels of the vehicle are stuck in the mud and the like, the temperature of the viscous fluid such as high viscosity silicone oils filled in the operating chamber of the viscous coupling increases to cause the pressure of the viscous fluid hermetically confined within the operating chamber of the viscous coupling to increase. Under such circumstances, when the pressure of the viscous fluid confined within the operating chamber of the viscous coupling reaches a predetermined value, the first resistance plates of the first torque-transmitting member are brought into a close contact with the second resistance plates of the second torque-transmitting member so that torque to be transmitted between these torque-transmitting members is abruptly increased to produce a so-called "hump torque" which enables the vehicle to escape from the mud and the like.

In case that such conventional viscous coupling is employed as a limited slip differential which is interposed between opposite wheels of a front-wheel axle of the vehicle, since the above-mentioned hump torque substantially inhibits the front wheels to produce a difference in rotational speed therebetween, it is very difficult for a driver of such vehicle to perform the steering operation of the vehicle. This is a disadvantage inherent in the conventional viscous coupling.

Consequently, in case that the viscous coupling is employed as the limited slip differential interposed between the opposite wheels of the front-wheel axle of the vehicle, it is desirable to prevent the hump torque from being produced in such viscous coupling by employing a plurality of spacer rings each of which is interposed between adjacent ones of: the first resistance plates of the first torque-transmitting member; and the second resistance plates of the second torque-transmitting member; so that the first resistance plates are prevented from being brought into a close contact with the second esistance plates, whereby the hump torque is eliminated in the thus modified conventional viscous coupling. However, such spacer rings considerably increase the number of parts required for such modified conventional viscous coupling. This is a disadvantage inherent in the modified conventional viscous coupling.

SUMMARY OF THE INVENTION

Under such circumstances, the present invention was made. Consequently, it is an object of the present invention to provide a small-sized, light-weight, simple-construction and low-cost viscous coupling the number of parts of which is minimized, and in which viscous coupling each of a plurality of first resistance plates of a first torque-transmitting member is surely spaced apart from each of a plurality of second resistance plates of a second torque-transmitting member so as to prevent a so-called "hump torque" from being produced in operation.

In accordance with a first aspect of the present invention, the above object of the present invention is accomplished by providing:

In a viscous coupling comprising:
- a first and a second torque-transmitting member so arranged as to be rotatable relative to each other;
- an operating chamber which is defined between the first and the second torque-transmitting member while filled with a viscous fluid;
- a plurality of first resistance plates so engaging with the first torque-transmitting member in the operating chamber as to be prevented from rotating relative to the first torque-transmitting member; and
- a plurality of second resistance plates so engaging with the second torque-transmitting member in the operating chamber as to be prevented from rotating relative to the second torque-transmitting member;

the improvement wherein:

the viscous coupling further comprises a plurality of spacer rings each of which is interposed between adjacent ones of the first or the second resistance plates, each of which spacer ring is provided with an annular peripheral groove in which a peripheral portion of each of the second or the first resistance plates is fitted, so that the first resistance plates are surely spaced apart from the second resistance plates through the spacer rings, whereby a so-called hump torque is prevented from being produced in the viscous coupling even when a difference in rotational speed between the first resistance plates of the first torque-transmitting member and the second resistance plate of the second torque-transmitting member in the viscous coupling increases.

In accordance with a second aspect of the present invention, the above object of the present invention is accomplished by providing:

The viscous coupling as set forth in the first aspect of the present invention, wherein:

each of the spacer rings is interposed between adjacent ones of the first resistance plates of the first torque-transmitting member, each of which spacer rings is provided with an annular peripheral groove in its inner peripheral surface, in which annular peripheral groove of each of the spacer rings an outer peripheral portion of each of the second resistance plates is fitted, so that the first resistance plates are surely spaced apart from the second resistance plates through the spacer rings.

In accordance with a third aspect of the present invention, the above object of the present invention is accomplished by providing:

The viscous coupling as set forth in the first aspect of the present invention, wherein:

each of the spacer rings is interposed between adjacent ones of the second resistance plates of the second torque-transmitting member, each of which spacer rings is provided with an annular peripheral groove in its outer peripheral surface, in which annular peripheral groove of each of the spacer rings an inner peripheral portion of each of the first resistance plates is fitted, so that the first resistance plates are surely spaced apart from the second resistance plates through the spacer rings.

In accordance with a fourth aspect of the present invention, the above object of the present invention is accomplished by providing:

The viscous coupling as set forth in the second aspect of the present invention, wherein:

each of the spacer rings is integrally formed with the outer peripheral portion of each of the second resistance plates.

In accordance with a fifth aspect of the present invention, the above object of the present invention is accomplished by providing:

The viscous coupling as set forth in the third aspect of the present invention, wherein:

each of the spacer rings is integrally formed with the inner peripheral portion of each of the first resistance plates.

In accordance with a sixth aspect of the present invention, the above object of the present invention is accomplished by providing:

The viscous coupling as set forth in the first aspect of the present invention, wherein:

each of the spacer rings is interposed: between adjacent ones of the first resistance plates; and between adjacent ones of the second resistance plates; so that the outer peripheral portion of each of the second resistance plates is fitted in the annular groove formed in the inner peripheral surface of each of the spacer rings having been interposed between the adjacent ones of the first resistance plates, and the inner peripheral portion of each of the first resistance plates is fitted in the annular groove formed in the outer peripheral surface of each of the spacer rings having been interposed between the adjacent ones of the second resistance plates.

The above object, additional objects, additional embodiments, advantages of the present invention will be clarified to those skilled in the art hereinbelow with reference to the following description and accompanying drawings illustrating a preferred embodiment of the present invention according to principle of the present invention.

DESCRIPTION OF THE PREFERRED EMBODIMENTS

Hereinbelow, a preferred embodiment of a viscous coupling of the present invention will be described in detail with reference to the drawings.

Figure 1:
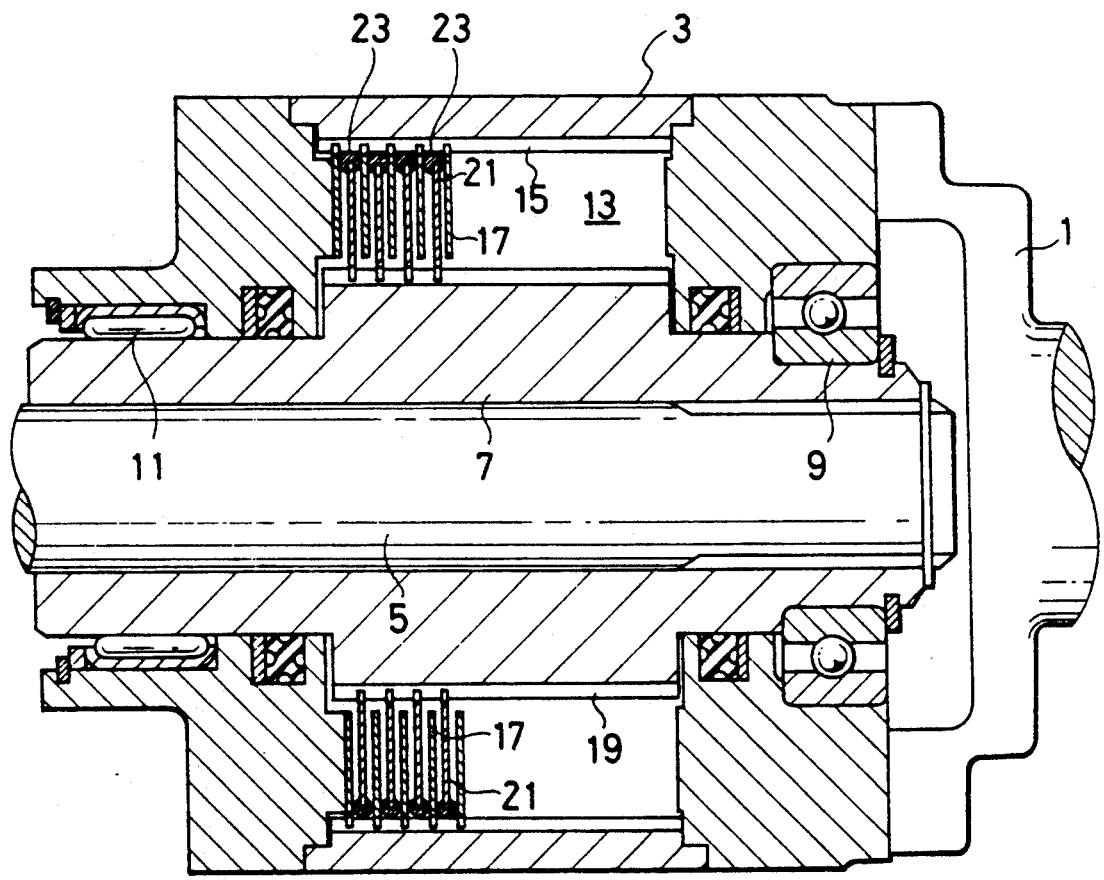
FIG. 1 is a longitudinal sectional view of a preferred embodiment of a viscous coupling of the present invention.
Figure 2:
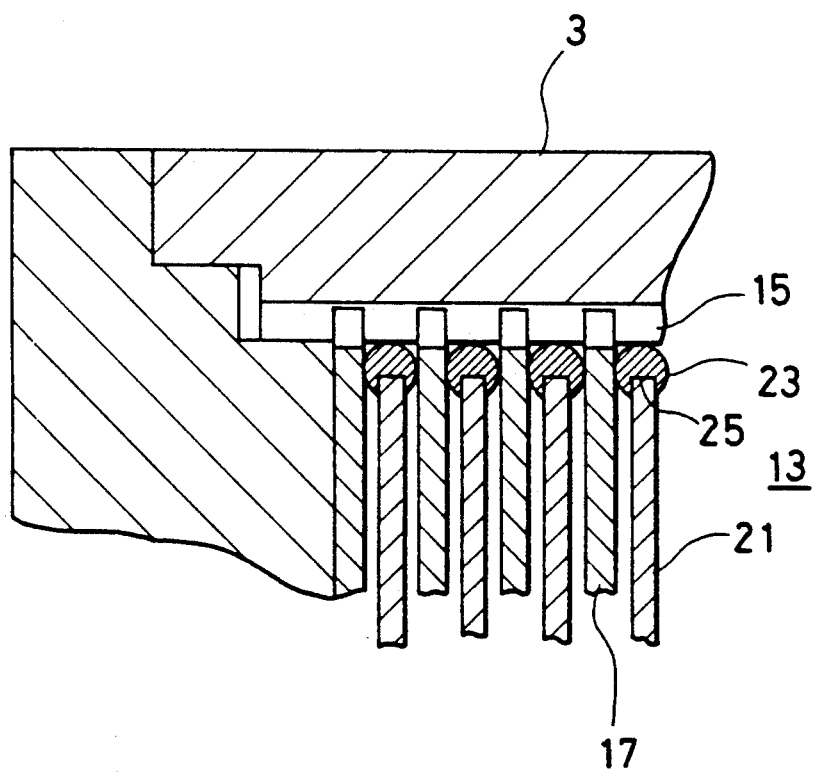
FIG. 2 is an enlarged sectional view of an essential part of the viscous coupling of the present invention shown in FIG. 1.

FIG. 1 is a longitudinal sectional view of a preferred embodiment of a viscous coupling of the present invention, and FIG. 2 is an enlarged sectional view of an essential part of the viscous coupling of the present invention shown in FIG. 1.

The embodiment of the viscous coupling of the present invention comprises: a first torque-transmitting member 1 an end portion of which is formed into a housing portion 3; a second torque-transmitting member 5 rotatably arranged relative to the first torque-transmitting member 1, an outer peripheral surface of an end portion of which second torque-transmitting member 5 is splined to an inner peripheral surface of an end portion of a sleeve member 7 so that the second torque-transmitting member 5 and the sleeve member 7 must turn together, the sleeve member 7 being rotatably mounted in the housing portion 3 of the first torque-transmitting member 1 through bearings 9, 11; and operating chamber 13 which is hermetically defined by the housing portion 3 of the first torque-transmitting member 1 and the sleeve member 7 while filled with a viscous fluid such as high viscosity silicone oils.

In the operating chamber 13 of the viscous coupling of the present invetion, as shown in FIG. 1: a plurality of first resistance plates 17 are so mounted on an inner peripheral surface of the housing portion 3 of the first torque-transmitting member 1 as to be non-rotatable relative to the first torque-transmitting member 1, an outer peripheral portion of each of the first resistance plates 17 being splined to the inner peripheral surface of the housing portion 3 of the first torque-transmitting member 1 so that the first resistance plates 17 and the housing portion 3 of the first torque-transmitting member 1 must turn together, the thus splined inner peripheral surface being denoted by the reference numeral 15 in FIG. 1; and a plurality of second resistance plates 21 are so mounted on an outer peripheral surface of the sleeve member 7 as to be non-rotatable relative to the sleeve member 7, the second resistance plates 21 being spaced alternately with the first resistance plates 17 in the operating chamber 13, an inner peripheral portion of each of the second resistance plates 21 being splined to the outer peripheral surface of the sleeve member 7 so that the second resistance plates 21 and the sleeve member 7 must turn together,; whereby the viscous resistance of the viscous fluid to rotation of the first ones 17 or second ones 21 of the resistance plates 17, 21 to the other (i.e., the second ones 21 or the first ones 17) of the resistance plates 17, 21 provides a means for transmitting torque between the first resistance plates 17 and the second resistance plates 21, which torque so automatically varies as to be substantially proportional to a difference in rotational speed between the first resistance plates 17 of the first torque-transmitting member 1 and the second resistance plates 21 of the second torque-transmitting members 5, for example, one of which torque-transmitting members 1, 5 is connected with a front-wheel shaft while the other of which torque-transmitting members 1, 5 is connected with a rear-wheel shaft.

As shown in FIG. 1, in the embodiment of the viscous coupling of the present invention, each of a plurality of spacer rings 23 is interposed between adjacent ones of the first resistance plates 17 of the first torque-transmitting member 1. As shown in FIG. 2, each of the spacer rings 23 is provided with an annular groove 25 in its an inner peripheral surface. Fitted in the annular groove 25 of each of the spacer rings 23 is an outer peripheral portion of each of the second resistance plates 21 the inner peripheral surfaces of which are splined to the outer peripheral surface of the sleeve member 7 so that the second resistance plates 21 and the sleeve member 7 must turn together.

Since the viscous coupling of the present invention has the above construction, the first resistance plates 17 are surely spaced apart from the second resistance plates 21 by means of the spacer rings 23.

Incidentally, each of the spacer rings 23 is made of a suitable material which is effective in reducing sliding resistance of the spacer rings 23 to the second resistance plates 21.

Now, operation of the embodiment of the viscous coupling of the present invention having the above construction will be described.

Torque transmitted to the first torque-transmitting member 1 is transmitted to the housing portion 3 of the first torque-transmitting member 1 from which the torque is transmitted to the first resistance plates 17 through which the torque is further transmitted to the second resistance plates 21 through the viscous resistance of the viscous fluid to rotation of the first resistance plates 17, the viscous fluid such as high viscosity silicone oils being filled in the operating chamber 13 of the viscous coupling. Then, the torque is transmitted from the second resistance plates 21 to the sleeve member 7 from which the torque is transmitted to the second torque-transmitting member 5.

When a difference in rotational speed between the first torque-transmitting member 1 and the second torque-transmitting member 5 increases, the first resistance plates 17 of the first torque-transmitting member 1 tend to be brought into a close contact with the second resistance plates 21 of the second torque-transmitting member 5. However, in the viscous coupling of the present invention having the above construction, since each of the spacer rings 23 is interposed between the adjacent ones of the first resistance plates 17 so that the first resistance plates 17 are surely prevented from being brought into a close contact with the second resistance plates 21, there is no fear that the so-called hump torque is produced in the viscous coupling of the present invention.

In addition, in the viscous coupling of the present invention, since the first resistance plates 17 of the first torque-transmitting member 1 are equally spaced apart from the second resistance plates 21, the viscous coupling of the present invention shows substantially no variations in torque being transmitted between the first resistance plates 17 and the second resistance plates 21.

Figure 3:
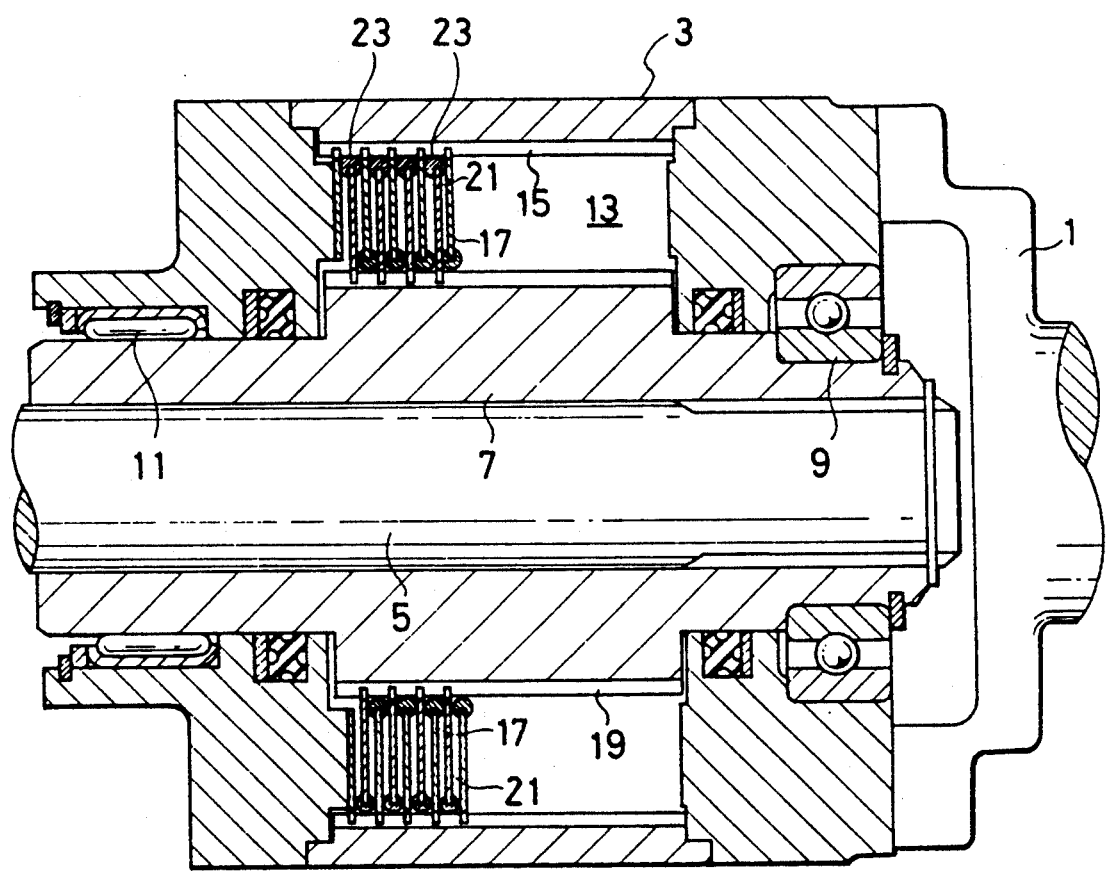
FIG. 3 is a longitudinal section view of another embodiment of a viscous coupling of the present invention.
Figure 4:
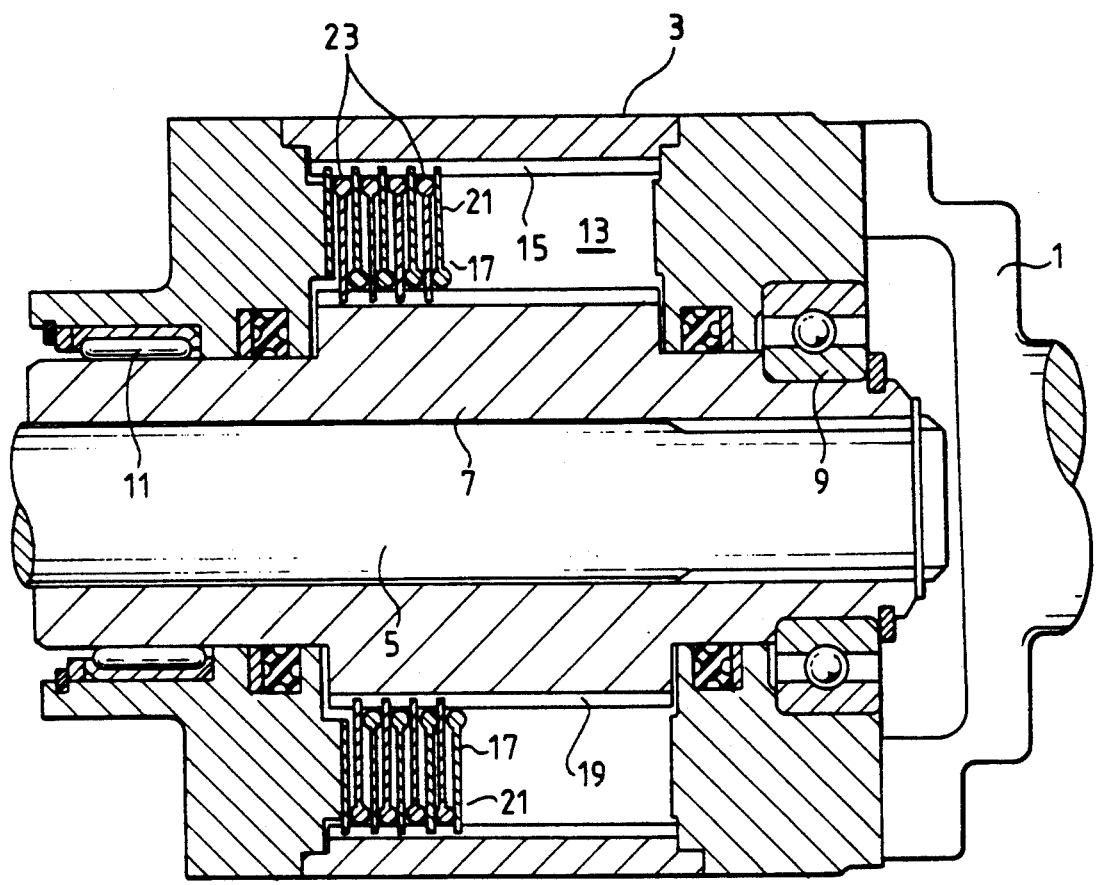
FIG. 4 is an enlarged sectional view like that of FIG. 3 of another embodiment of the present invention.

Incidentally, the present invention is not limited to the above embodiment only. Namely, it is possible to modify the embodiment of the present invention so as to interpose each of the spacer rings (23) between adjacent ones of the second resistance plates 21 in place of adjacent ones of the first resistance plates 17. In the thus modified embodiment of the present invention, each of the spacer rings (23) is provided with an annular groove in its outer peripheral surface in place of its inner peripheral surface, so that an inner peripheral portion of each of the first resistance plates 17 is fitted in the annular groove of each of the spacer rings (23) of the modified embodiment of the present invention. Further, it is also possible to modify the embodiment of the present invention so as to interpose each of the spacer rings (23): between adjacent ones of the first resistance plates 17; and between adjacent ones of the second resistance plates 21; so that the outer peripheral portion of each of the second resistance plates 21 is fitted in the annular groove formed in the inner peripheral surface of each of the spacer rings (23) having been interposed between the adjacent ones of the first resistance plates 17, and the inner peripheral portion of each of the first resistance plates 17 is fitted in the annular groove formed in the outer peripheral surface of each of the spacer rings (23) having been interposed between the adjacent ones of the second resistance plates 21, as seen in FIG. 3. Furthermore, it is also possible to modify the embodiment of the present invention, so that each of the spacer rings (23) is integrally formed with the peripheral portion of each of the resistance plates 17, 21.

As described above, since the viscous coupling of the present invention has the above construction, it is possible for the viscous coupling of the present invention to prevent the hump torque from being produced therein even when a difference in rotational speed between the first torque-transmitting member 1 and the second torque-transmitting member 5 increases. This is an effect of the present invention. In addition, in the viscous coupling of the present invention, since the spacer rings 23 are mounted on only ones (17 or 21) of the resistance plates 17, 21, the number of parts required for the viscous coupling of the present invention is considerably reduced. This is another effect of the present invention.

While the present invention has been described above, it is not intended that the present invention be so limited as to be illustrated in the drawings since certain modifications of the embodiment of the present invention may be made without departing from the scope of the present invention.

What is claim:

1. A viscous coupling comprising:
   a first and a second torque-transmitting member so arranged as to be rotatable relative to each other;
   an operating chamber which is defined between said first and said second torque-transmitting member while filled with a viscous fluid;
   a plurality of first resistance plates so engaging with said first torque-transmitting member in said operating chamber as to be prevented from rotating relative to said first torque-transmitting member;
   a plurality of second resistance plates so engaging with said second torque-transmitting member in said operating chamber as to be prevented from rotating relative to said second torque-transmitting member; and
   a plurality of spacer rings each of which is interposed between adjacent ones of said first or said second resistance plates such that said adjacent plates abut said spacers, each of which spacer rings is provided with an annular peripheral groove said spacer rings are mounted via said annular peripheral groove on a peripheral portion of each of said second or said first resistance plates, so that said first resistance plates are surely spaced apart from said second resistance plates through said spacer rings to prohibit axial movement between said first and second resistance plates, whereby the so-called hump torque is prevented from being produced in said viscous coupling even when a difference in rotational speed between said first resistance plates and said first torque-transmitting member and said second resistance plate of said second torque-transmitting member in said viscous coupling increases.

2. The viscous coupling as set forth in claim 1, wherein: each of said spacer rings is interposed between adjacent ones of said first resistance plates, each of which spacer rings is provided with an annular peripheral groove in its inner peripheral surface, in which annular peripheral groove of each of said spacer rings an outer peripheral portion of each of said second resistance plates is fitted, so that said first resistance plates are surely spaced apart from said second resistance plates through said spacer rings.

3. The viscous coupling as set forth in claim 1, wherein: each of said spacer rings is interposed between adjacent ones of said second resistance plates, each of which spacer rings is provided with an annular peripheral groove in its outer peripheral surface, in which annular peripheral groove of each of said spacer rings an inner peripheral portion of each of said first resistance plates is fitted, so that said first resistance plates are surely spaced from said second resistance plates through said spacer rings.

4. The viscous coupling as set forth in claim 1, wherein: each of said spacer rings is interposed: between adjacent ones of said first resistance plates; and between adjacent ones of said second resistance plates; so that an outer peripheral portion of each of said second resistance plates is fitted in said annular groove formed in an inner peripheral surface of each of said spacer rings having been interposed between said adjacent ones of said first resistance plates, and an inner peripheral portion of each of said first resistance plates is fitted in said annular groove formed in an outer peripheral surface of each of said spacer rings having been interposed between said adjacent ones of said second resistance plates.

5. A viscous coupling comprising:
   a first and a second torque-transmitting member so arranged as to be rotatable relative to each other;
   an operating chamber which is defined between said first and said second torque-transmitting member while filled with a viscous fluid;
   a plurality of first resistance plates so engaging with said first torque-transmitting member in said operating chamber as to be prevented from rotating relative to said first torque-transmitting member;
   a plurality of second resistance plates so engaging with said second torque-transmitting member in said operating chamber as to be prevented from rotating relative to said second torque-transmitting member; and
   a plurality of spacer rings each of which is interposed between adjacent ones of said first or said second resistance plates such that said adjacent plates abut said spacers, each of which spacer rings integrally formed with a peripheral portion of each of said second or said first resistance plates so that said first resistance plates are surely spaced apart from said second resistance plates through said spacer rings to prohibit axial movement between said first and second resistance plates, whereby the so-called hump torque is prevented from being produced in said viscous coupling even when a difference in rotational speed between said first resistance plates and said first torque-transmitting member and said second resistance plate of said second torque-transmitting member in said viscous coupling increases.

6. The viscous coupling as set forth in claim 5, wherein: each of said spacer rings is integrally formed with an outer peripheral portion of each of said second resistance plates.

7. The viscous coupling as set forth in claim 5, wherein: each of said spacer rings is integrally formed with an inner peripheral portion of each of said first resistance plates.

* * * * *